US008578681B2

(12) United States Patent
Patterson et al.

(10) Patent No.: US 8,578,681 B2
(45) Date of Patent: Nov. 12, 2013

(54) TOWER CONNECTOR

(75) Inventors: Rowan Warwick Patterson, Beccles (GB); Matthew Marcantonio, Norwich (GB)

(73) Assignee: Claxton Engineering Services Limited (GB)

( * ) Notice: Subject to any disclaimer, the term of this patent is extended or adjusted under 35 U.S.C. 154(b) by 0 days.

(21) Appl. No.: 13/275,848

(22) Filed: Oct. 18, 2011

(65) Prior Publication Data

US 2012/0137622 A1   Jun. 7, 2012

(30) Foreign Application Priority Data

Oct. 18, 2010 (GB) .................................. 1017555.2

(51) Int. Cl.
E04C 3/00 (2006.01)

(52) U.S. Cl.
USPC ....... 52/848; 52/651.01; 52/651.07; 403/292; 403/336

(58) Field of Classification Search
USPC ................. 52/651.01, 651.07, 834, 848, 301; 403/292, 293, 336; 405/202
See application file for complete search history.

(56) References Cited

U.S. PATENT DOCUMENTS

| | | | |
|---|---|---|---|
| 1,257,536 A | | 2/1918 | Schroeder |
| 2,409,060 A | * | 10/1946 | Moore ........................ 52/651.07 |
| 2,820,658 A | * | 1/1958 | Bender ............................ 403/13 |
| 2,843,405 A | * | 7/1958 | Kowalik ........................ 403/266 |
| 3,081,114 A | | 3/1963 | Esty |
| 3,204,898 A | | 9/1965 | Manning |
| 3,663,043 A | * | 5/1972 | Walton ............................ 285/113 |
| 3,793,794 A | * | 2/1974 | Archer et al. .................... 52/632 |
| 3,895,471 A | * | 7/1975 | Kolb .............................. 405/227 |
| 4,137,722 A | * | 2/1979 | Mossiossian et al. ......... 405/202 |
| 4,408,932 A | * | 10/1983 | Cowan .......................... 405/227 |
| 4,445,807 A | * | 5/1984 | Cowan .......................... 405/227 |
| 4,497,592 A | * | 2/1985 | Lawson ........................ 405/202 |
| 4,518,277 A | * | 5/1985 | Bush et al. .................... 403/102 |
| 4,949,525 A | * | 8/1990 | Weaver ...................... 40/606.14 |
| 4,986,687 A | * | 1/1991 | Ivey ................................ 403/2 |
| 5,090,837 A | * | 2/1992 | Mower ........................ 403/334 |
| 5,333,436 A | * | 8/1994 | Noble .............................. 52/849 |
| 5,480,265 A | * | 1/1996 | Marshall et al. .............. 405/224 |
| 5,511,831 A | * | 4/1996 | Barton .......................... 285/382 |

(Continued)

FOREIGN PATENT DOCUMENTS

| | | |
|---|---|---|
| FR | 2 787 486 A1 | 6/2000 |
| GB | 190910194 A | 0/1909 |
| GB | 2423108 A | 8/2006 |
| GB | 2468926 A | 9/2010 |

OTHER PUBLICATIONS

European Search Report for EP 11185518, mailed on Dec. 22, 2011 (2 pages).

(Continued)

Primary Examiner — Basil Katcheves
Assistant Examiner — Joshua Ihezie
(74) Attorney, Agent, or Firm — Egan, Peterman & Enders LLP

(57) ABSTRACT

The disclosure relates to a connector assembly (20) for joining a main tower (102) to a base structure (114) where the axial alignment of the tower to the base structure needs to be adjustable, and to a method of using such a connector assembly to assemble a tower structure.

20 Claims, 4 Drawing Sheets

(56) References Cited

U.S. PATENT DOCUMENTS

| | | | |
|---|---|---|---|
| 5,632,464 A | 5/1997 | Aberle | |
| 6,408,575 B1 * | 6/2002 | Yoshida et al. | 52/40 |
| 6,532,700 B1 * | 3/2003 | Maliszewski et al. | 52/40 |
| 6,578,339 B1 * | 6/2003 | McGinnis | 52/651.01 |
| 6,857,808 B1 * | 2/2005 | Sugimoto et al. | 403/41 |
| 6,907,706 B1 * | 6/2005 | Schippmann et al. | 52/848 |
| 6,957,518 B1 * | 10/2005 | Koch, Jr. | 52/849 |
| 7,059,095 B1 * | 6/2006 | Stevens et al. | 52/651.01 |
| 7,116,282 B2 * | 10/2006 | Trankina | 52/845 |
| 7,121,881 B2 * | 10/2006 | Jones | 439/578 |
| 7,464,512 B1 * | 12/2008 | Perina | 52/651.01 |
| 7,905,677 B1 * | 3/2011 | Erickson | 403/379.3 |
| 8,056,297 B2 * | 11/2011 | Mathai et al. | 52/651.01 |
| 2002/0170261 A1 * | 11/2002 | Brunozzi et al. | 52/721.4 |
| 2002/0170264 A1 * | 11/2002 | Koszo | 52/737.4 |
| 2003/0205021 A1 * | 11/2003 | Ryan | 52/736.1 |
| 2006/0236648 A1 * | 10/2006 | Grundman et al. | 52/726.4 |
| 2007/0256388 A1 * | 11/2007 | Ianello et al. | 52/651.07 |
| 2008/0041009 A1 * | 2/2008 | Cairo et al. | 52/651.07 |
| 2008/0250752 A1 * | 10/2008 | Bowman et al. | 52/848 |
| 2009/0016897 A1 * | 1/2009 | Olgaard | 416/244 R |
| 2010/0101173 A1 * | 4/2010 | Bagepalli | 52/651.01 |

OTHER PUBLICATIONS

Search Report for U.K. Application No. 1017555.2, mailed Feb. 17, 2011 (4 pages).

* cited by examiner

TOWER CONNECTOR

RELATED APPLICATIONS

The application claims priority to U.K. Patent Application No. 1017555.2, filed Oct. 18, 2010, the contents of which are hereby incorporated by reference in their entirety.

BACKGROUND a. Field

The disclosure relates to a connector assembly for joining a tower to a base structure where the axial alignment of the tower to the base structure needs to be adjustable, and to a method of using such a connector to assemble a tower structure.

b. Related Art

Currently offshore wind turbine towers have a main tower with a tubular body, the lower end of which has a flange to which is welded a tubular transition piece that extends downwards from the tubular body for connection to a tubular base of a lower supporting structure. The lower supporting structure may be a single tubular pile driven into relatively shallow water and a transition piece is then attached. The upper end of the pile then provides the tubular base. Alternatively, when the water is deeper, the lower supporting structure may include a framework structure formed from a lattice of structural members supported by a number of seabed piles and terminated at an upper end by a tubular member that forms the tubular base for the turbine tower.

When the main tower is to be connected to the tubular base of the lower supporting structure, the tubular transition piece, which has an inner diameter greater than the outer diameter of the tubular base, is inserted over the tubular base. Typically, the drilled or driven pile is installed with its axis aligned to within 0.5° of vertical.

Wind velocities increase at higher altitudes due to decreased surface aerodynamic drag by land or water surfaces, and so there is the need to maximize the height of the turbine blades. The tallest wind turbines have a main tower more than 100 m in height. At a height of 100 m, a misalignment of 0.5° of the main tower with respect to vertical will result in a tilt of about 90 cm from vertical at the top of the main tower. Such a lean will add to the moment loads to be applied to the foundations of the wind turbine. To compensate for this amount of misalignment, it then becomes necessary to increase the strength of the main tower and lower supporting structure and foundations. Ideally the tower needs to be as close to vertical a possible to ensure even loading on the tower and turbine.

Therefore, in order to permit the axial alignment between the tubular body of the main tower and the tubular base to be adjusted, it is known to provide a clearance gap between the outer tubular transition piece and the inner tubular base. The gap allows a certain degree of movement between the tubular body of the main tower and the tubular base prior to these being fixed in place with respect to each other, and also accommodates the fact such tubular members, which may be around 6 m in diameter, may be slightly oval with a deviation from circularity of up to about ±1.5% and with a tolerance on nominal diameter of about ±1.0%.

The transition piece, which may weigh 200 tonnes, is suspended by a crane, and then the orientation of the transition piece is adjusted until this is sufficiently close to vertical. The orientation and spacing transition from the tubular base is then set by internal pads inside the gap at the top of the pile and then fixed in place with a high quality epoxy grout inserted between the outer wall of the pile and the inner wall of the tubular transition piece. The grout may take about one week to cure.

A number of problems have been noted with this alignment and setting procedure.

It takes time for the grout to set, during which the main transition piece has to be kept carefully in place by the crane, all of which is very expensive. Furthermore the grout interface has in some cases shown a tendency over time to break, up resulting in an insecure foundation and expensive remedial work.

It is therefore an object of the present disclosure to provide a connector assembly for joining a pair of tubular members where the axial alignment of the tubular members needs to be adjustable, and to a method of using such a connector assembly.

SUMMARY

According to a first aspect of the disclosure, there is provided a connector assembly for affixing a main tower to a lower base structure, the connector assembly comprising two connector portions, a first one of said connector portions being for affixing at an upper end of said lower base structure and a second one of said connector portions being for affixing at a lower end of said tower, one of said connector portions having a ring and the other of said connector portions having a collar, the ring defining a ring axis and the collar defining a collar axis and having an opening for receiving the ring, and said connector portions including clamping means for clamping engagement of the ring within the collar, wherein:

the ring includes a seat and the collar includes an abutment, the abutment being in contact with the seat for transferring the weight of said tower to said base structure when the ring is clamped within the collar by the clamping means;

the ring has a main body and a flange, the flange extending radially outwards from the main body of the ring and said flange providing said seat; and the contact between the seat and the abutment is along an interface that permits tilt adjustment of the ring axis and collar axis prior to said clamping engagement of the ring within the collar.

In use, the seat bears the weight of the tower and the abutment transfers the weight of the tower to the base structure when the tower is affixed to the base structure.

In an embodiment of the disclosure, the curved surface is curved in a plane that includes either the collar axis or the ring axis, and the interface also permits the tilt adjustment of the ring axis and collar axis in two orthogonal directions so that any tilt misalignment between the main tower and lower base structure can be accommodated by the connector assembly.

The interface preferably includes at least one surface that is curved to permit ball and socket type movement between the first and second connector portions. In this case, it is not necessary that surfaces of the interface form a complete ball surface or a complete socket, but only that the curved surface is sufficiently extensive that the movement provided by a ball and socket joint is provided. In an embodiment of the disclosure, the curved surfaces are annular and each is centered on an axis defined by the annular surface.

The interface that permits tilt adjustment of the ring axis and collar axis may include surfaces on both the seat and abutment that are curved to permit ball and socket type movement of the first and second connector portions. Alternatively, just one of these surfaces may be curved, for example being convex in cross-section through its axis, and the other of the surfaces may be flat in cross-section through its axis.

The clamping means may include a plurality of movable members mounted in the collar and actuation means for driving the movement of the moveable members to engage with the ring. Each movable member may comprise a dog movable in a radial direction, the movement of each dog being driven by a corresponding drive dog movable in an axial direction, with each dog and drive dog having oppositely inclined surfaces in contact with each other such that the axial movement of a drive dog causes a radial movement in the corresponding dog.

In an embodiment of the disclosure, collar has an inner wall and an outer wall, the inner wall being adapted to surround the ring with a gap between collar and the ring. The inner wall may have a plurality of apertures, each aperture leading to a passage through the inner wall. Then, each of the dogs may be slidably seated in one of the passages for movement in a radial direction with respect to the ring axis.

The contacting sliding surfaces of each drive dog and dog are oppositely inclined, such that when the drive dog is moved in one axial direction relative to the dog, the dog is driven in a radially inwardly direction across the gap to grip the ring.

In use, the contact between the drive dog and the outer wall of the collar provides a restoring force to a gripping force transmitted radially outwards from the dog when this contacts the ring. The gripping force exerted by the dogs, which are preferably evenly spaced circumferentially around the collar, then clamps the collar to the ring.

It is advantageous if the movement means for each drive dog is independent of the movement means for other drive dogs so that a plurality of drive dogs may be independently moved. Each corresponding dog is then independently driven in a radially inwardly direction across the gap.

The actuation means may be any convenient means for moving the drive dog. In an embodiment of the disclosure, the actuation means includes a threaded member, for example a bolt, which when turned, engages with an internal threaded bore in the drive dog to move the drive dog in an axial direction. Other actuation means may, however be used, for example hydraulic actuation.

The collar may include a radially extending flange that extends outwards from a main body of the collar. In an embodiment of the disclosure, the bolt extends through this flange.

The ring may have a recess in which the movable members, or dogs, are located to clamp the ring within the collar.

The ring may have a main body and a flange, the flange extending radially outwards from the main body of the ring and the flange providing the seat.

The flange of the ring may have a pair of opposite side surfaces, one of these side surfaces providing the seat and the other of the side surfaces providing a clamping surface for the clamping engagement of the ring within the connector.

The side surfaces may extend away from the main body of the ring such that the side surfaces are inwardly inclined with respect to each other and to a radially extending plane. Preferably, the inclined surfaces are inclined at the same but opposite angle with respect to a radially extending plane so that clamping forces and the forces stemming from the weight of the tower can be balanced.

The flange is also preferably in the form of a lip that extends around the circumference of the ring.

The flange may be bounded by an adjacent channel in the main body of the ring, this channel providing the recess so that the flange is held between the abutment and the movable members, or dogs, when the ring is clamped within the collar.

According to a second aspect of the disclosure, there is provided a turbine tower, comprising a main tower for supporting a turbine generator, a lower base structure for supporting said main tower, and a connector assembly for affixing the main tower to the lower base structure, the connector assembly comprising two connector portions, a first one of said connector portions being for affixing at an upper end of said lower base structure and a second one of said connector portions being for affixing at a lower end of said tower, one of said connector portions having a ring and the other of said connector portions having a collar, the ring defining a ring axis and the collar defining a collar axis and having an opening for receiving the ring, and said connector portions including clamping means for clamping engagement of the ring within the collar, wherein:

the ring includes a seat and the collar includes an abutment, the abutment being in contact with the seat for transferring the weight of said tower to said base structure when the ring is clamped within the collar by the clamping means;

the ring has a main body and a flange, the flange extending radially outwards from the main body of the ring and said flange providing said seat;

the contact between the seat and the abutment is along an interface that permits tilt adjustment of the ring axis and collar axis prior to said clamping engagement of the ring within the collar; and one of the connector portions is affixed to a lower end of the main tower and the other of the connector portions is affixed to an upper end of the lower base structure.

In an embodiment of the disclosure, the first one of the connector portions has the seat and the second one of the connector portions has the abutment.

The upper end of the lower base structure may be substantially tubular, for example having a substantially circular cross-section, in which case the first connector portion where this is affixed to the upper end of the base structure may be substantially cylindrical.

The lower end of the main tower may also be substantially tubular, for example having a substantially circular cross-section, in which case the second connector portion where this is affixed to the lower end of the main tower may be substantially cylindrical.

The disclosure further provides a method of assembling a turbine tower, the turbine tower comprising a main tower for supporting a turbine generator, a lower base structure for supporting said main tower, and a connector assembly for affixing the main tower to the lower base structure, the connector assembly comprising two connector portions, one of said connector portions having a ring and the other of said connector portions having a collar, the ring defining a ring axis and the collar defining a collar axis, the ring having a main body and a flange, the flange extending radially outwards from the main body of the ring and the collar and ring having mating surfaces shaped so as to allow tilt adjustment of said axes, and said connector portions including clamping means, wherein the method comprises the steps of:

affixing a first one of said connector portions to a supporting surface of the earth;

joining a first one of said connector portions at an upper end of said lower base structure;

joining a second one of said connector portions at a lower end of said main tower;

bringing the free ends of the of the ring and the collar together until said mating surfaces come into contact;

adjusting the tilt of said axes to achieve a desired orientation of the main tower with respect to vertical;

using the clamping means to clamp the ring within the collar in order to fix the orientation of the main tower with respect to vertical.

The method may also comprise the steps of:

forming the connector portion for connection to the lower base structure with a rim that is relatively stronger than the upper end of the base structure;

joining said first one of said connector portions to the upper end of the base structure prior to said affixing of said connector portions to a supporting surface of the earth, such that the rim is at an upper end of said joined base structure and connector portion; and driving the joined base structure and connector portion into the supporting surface of the earth using force applied to the rim at said upper end of said joined base structure.

BRIEF DESCRIPTION OF THE DRAWINGS

The disclosure will now be further described, by way of example only, and with reference to the accompanying drawings, in which.

DETAILED DESCRIPTION

Figure 1:
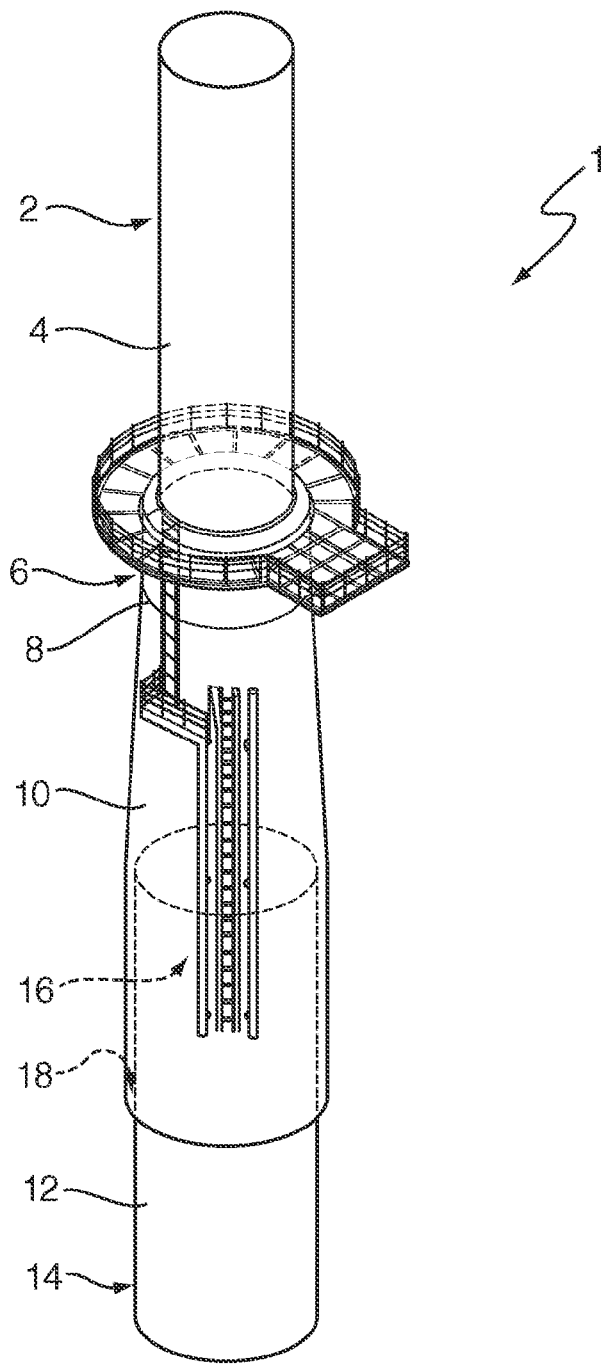
FIG. 1 is a perspective view of part of a wind turbine tower and supporting base structure according to the prior art.

FIG. 1 shows a prior art wind turbine tower 1 having a main tower 2 with a hollow tubular body 4, the lower end 6 of which has a flange 8 to which is welded a tubular transition piece 10 that extends downwards from the tubular body for connection to a tubular base 12 of a lower supporting structure 14. The lower supporting structure is in this example a single tubular pile 14 driven into the bed of a relatively shallow body of water. An upper end 16 of the pile then provides the tubular base 12.

When the main tower 2 is to be connected to the tubular base 12 of the lower supporting structure 14, the tubular transition piece 10, which has an inner diameter greater than the outer diameter of the tubular base 12, is inserted over the tubular base. Typically, the drilled or driven pile is installed with its axis aligned to within 0.5° of vertical.

To permit the axial alignment between the tubular body 4 of the main tower 2 and the tubular base 12 to be adjusted, a clearance gap 18 is provided between the outer tubular transition piece 10 and the inner tubular base 12. The gap 18 allows a certain degree of movement between the tubular body of the main tower 2 and the tubular base 12 prior to these being fixed in place with respect to each other, and also accommodates the fact such tubular members may be slightly oval.

With the main tower 2 suspended by a crane (not shown), the orientation of the tower is adjusted until this is sufficiently close to vertical. The orientation and spacing of the transition around the tubular base is then set by internal pads (not shown) inside the gap at the top of the pile 14 and then fixed in place with a high quality epoxy grout (not shown) inserted between the outer wall of the pile and the inner wall of the tubular transition piece.

As mentioned above, a number of problems have been noted with this alignment and setting procedure.

Figure 2:
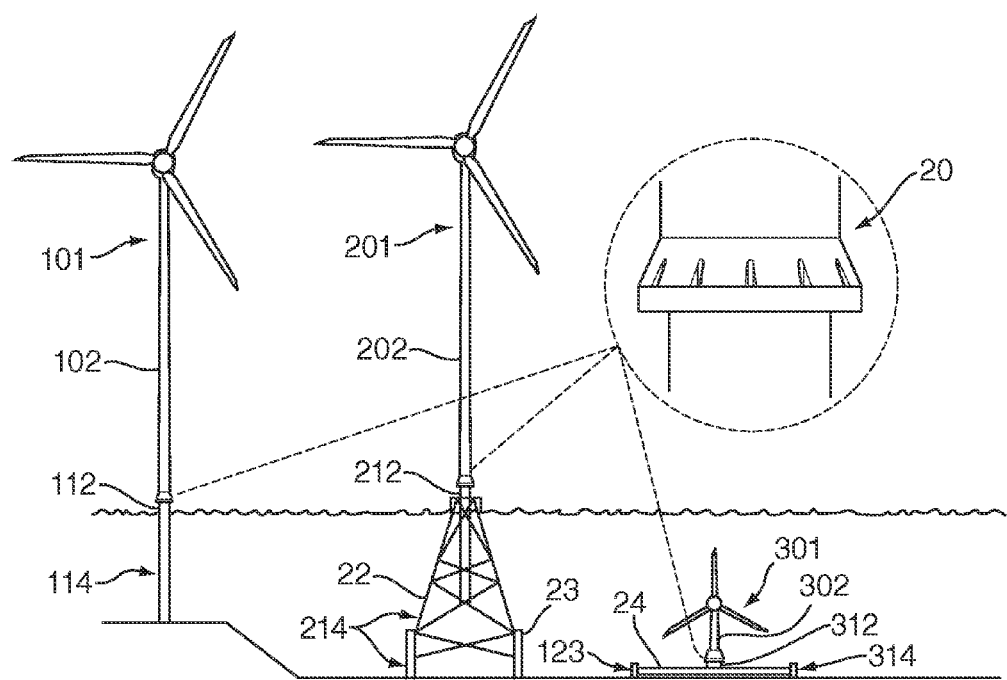
FIG. 2 is a view of three different wind and water turbines each of which comprises a connector assembly according to an embodiment of the disclosure.

As shown in FIG. 2, the disclosure is applicable to wind turbine towers standing in water, as well as to submerged tide turbines. In both cases, the lower base structure stands in a body of water, for example supported on piles driven into the seabed or lakebed. Although not illustrated, the disclosure is also applicable to wind turbines on dry land.

The disclosure therefore provides a connector assembly 20 for affixing a main tower 102, 202, 302 to a lower base structure 114, 214, 314. The disclosure is suitable for use in a variety of situations, for example: a shallow water wind turbine 101, where a main tower 102 having a hollow tubular body 104 is supported by supporting base support 112 formed from the top of a single tubular pile 114; a deeper water turbine 201 supported by a lower base structure formed from a base support 212 on a lattice framework structure 22 and four piles 23, the lattice structure being terminated at an upper end by a tubular member that forms a tubular base for the turbine tower; or a submerged tide turbine 301 supported on a base support 312 mounted on a triangular base frame 24 held down by three tubular piles 123.

FIGS. 3 to 7 show the connector assembly 20 in more detail. The connector assembly is formed in steel and has a first connector portion 26 that is welded 28 at an upper end 116 of the lower base support 112 and also a second connector portion 27 welded 30 at a lower end 106 of a main tower 102. In some instances, the weld could be facilitated by a flange or some other features at the weld interface.

The first connector portion 26 is preferably formed from a forged or cast tubular section with an outer profile that provides a connector interface. As will be described in more detail below, this connector interface includes an annular top radius profile. The second connector portion interfaces with and sits down on the top radius profile to provide for angular adjustment between the first and second connector portions to provide accurate adjustment for levelness/verticality.

The first connector portion 26 has a generally circular ring 31 and the second connector portion has a generally circular collar 32. Both the ring and collar have a cylindrical symmetry and so the ring defines a ring axis 33, while and the collar defines a collar axis 34. The collar also has an opening 35 at a lower end for receiving the ring 31. The connector portions 26, 27 include clamping means 40 for clamping engagement of the ring 31 within the collar 32.

Figure 3:
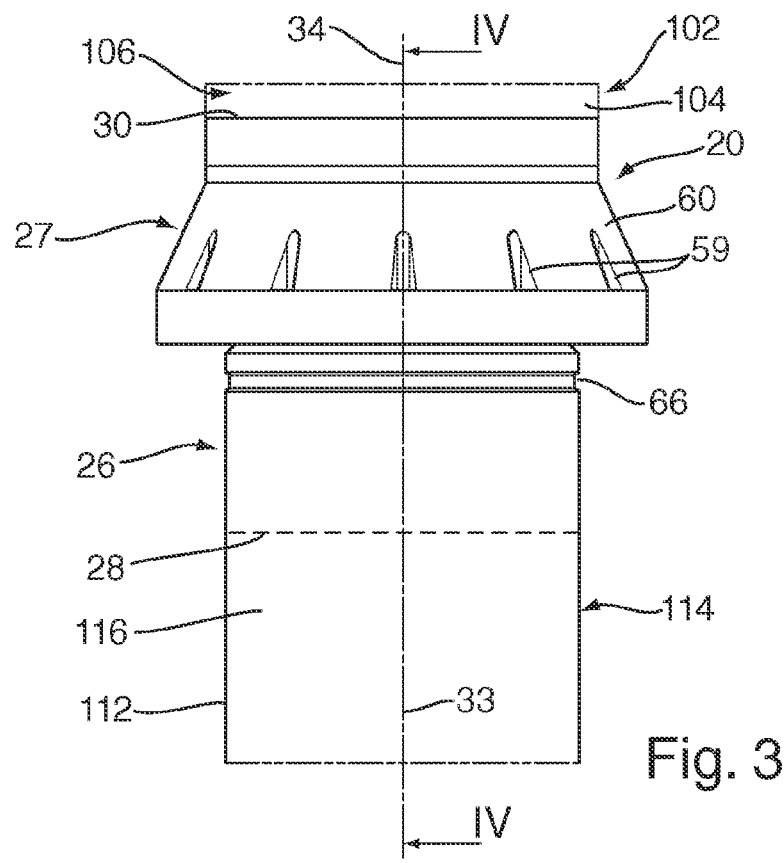
FIG. 3 is a side view in more detail of the connector assembly of FIG. 2 showing how this assembly comprises a first connector portion joined to the base support and a second connector portion joined to the main tower.
Figure 4:
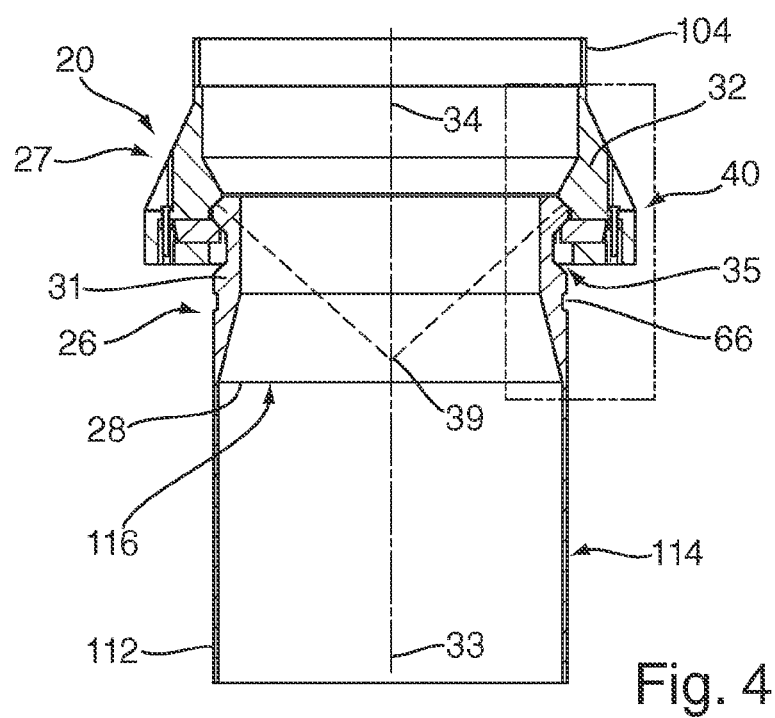
FIG. 4 is a cross-section view of the connector assembly, taken along lines IV-IV of FIG. 3, showing how an abutment at the lower end of the second connector portion rests on a seat formed by a first side surface of a lip that extends around the first connector portion, and how a clamping mechanism is used to clamp the main tower to the base support.
Figure 5:
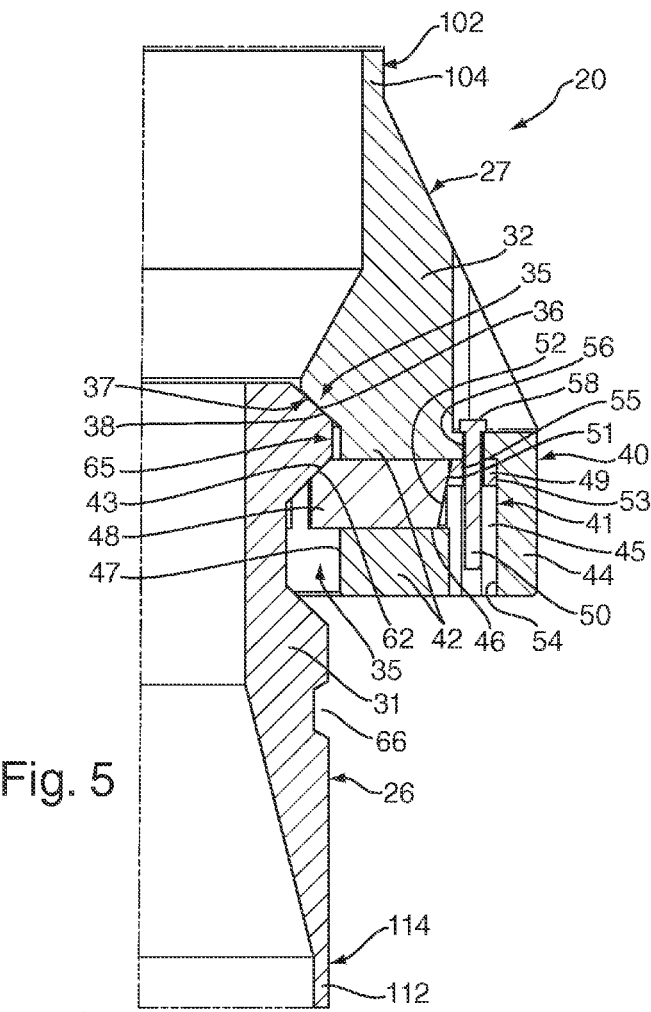
FIGS. 5 to 7 are enlarged views of the clamping mechanism of FIG. 4, showing how the clamping mechanism includes sliding blocks that are driven radially inwards by the axial movement of a drive block to engage with a second side of the lip so that the lip is held tightly between the abutment and sliding blocks.

As shown in FIGS. 3 to 5, the ring axis 33 and collar axis 34 may be collinear, however, the connector assembly 20 includes means to allow the alignment of these two axes to be varied within about 1.5° of each other in two orthogonal directions so that any tilt of the base support 112 away from vertical within these limits can be accommodated to achieve a vertical orientation of the main tower 102.

The ability to compensate for this amount of misalignment is provided by a pivot interface between the first and second connector portions 26, 27. The ring 31 has an annular seat 37 with a convex annular surface that is centered at a point 39 on the ring axis 33 near the top end 116 of the base support. This spherical surface therefore faces both radially away from the ring axis 33 and axially away from the ring 31 and towards the second connector portion 27.

The collar 32 has an abutment 35 with an annular concave surface 36 that is centered on the same point 39 on the ring axis 33 as that of the seat 37. This concave spherical surface therefore faces both radially towards the ring axis 33 and axially away from the collar 32 and towards the first connector portion 26.

Until clamped by the clamping means 40, which will be described in more detail below, the contact between the seat 37 and the abutment 35 is therefore along an interface which acts similarly to that of a ball and socket joint and which permits tilt adjustment of the ring axis 33 and collar axis 34.

As shown in the drawings, the abutment 35 is in contact with the seat 37 and serves in use to transfer the weight of the main tower 102 to the base structure 112. Once adjusted for the correct tilt alignment, the angular orientation of the ring 31 within the collar 32 is set using the clamping means 40. The clamping means comprises a plurality of clamps 41, preferably between about ten and twenty clamps, spaced evenly around the circumference of the collar 32 together with a corresponding clamping surface 43 on the ring 31. Each clamp 41 has an axially extending bore 45 and an intersecting radially extending bore 46 machined in the steel material of the collar 32. The inner and outer walls 42, 44 are therefore integrally formed. The bores 45, 46 define an outer wall 44 that is radially outwards from the axial bore 45 and an inner wall 42 that is radially inwards from the axial bore 45. Each of the radial bores 46 therefore passes through the inner wall 42 between the axial bore 45 and a cylindrical inner surface 47 of the collar 32.

Each clamp 41 has a moveable clamping block, or dog, 48, each of which acts as a clamping member against the clamping surface 43 and which is slideable within each of the bores 46 in the radial direction towards or away from the ring axis 33. Each radial bore 46 has a rectangular cross-section that is defined on four sides by the surfaces machined in the inner wall 42. The moveable clamping block 48 closely matches this profile.

The axial bore 45 also has a rectangular cross-section and holds a second movable block which is a drive block, or drive dog, 49 that has a flat radially outer surface 53 that is in sliding contact with a radially inner surface 54 of the outer wall 44. The axial bore 45 and drive block 49 each have a rectangular shape such that the drive block 49 moves with close sliding fit up and down in the axial bore depending on the turn of a drive bolt 50 with which the drive block is threaded. The drive block 49 has on a radially inwards side a flat inclined surface 51 which is in contact with an oppositely inclined surface 52 of the movable block 48, so that the drive block functions as cam block to move the movable clamping block 48 radially inwards when the drive block is driven upwards by the bolt 50.

Figure 6:
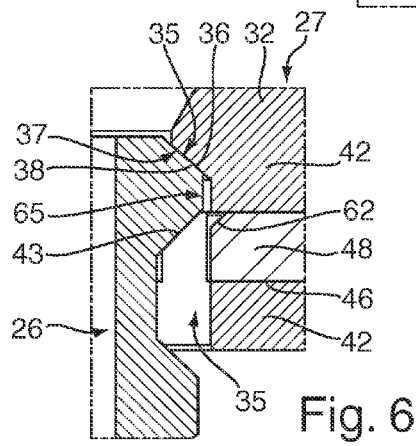
Figure 7:
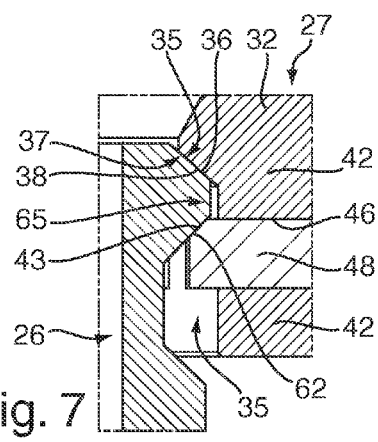

Both the movable block 48 and drive block 49 are machined from steel and have a rectangular shape as viewed in a radially extending cross-section. With reference now also to FIGS. 6 and 7, because the contacting surfaces 51, 52 of the drive block and movable block are oppositely inclined with respect to each other, when the drive block 49 is moved in an upwards axial direction, the movable block 48 is forced outwards through the bore 46 in a radially inwards direction. During this process, the inner surface 54 of the outer wall 44 prevents the drive block 49 from moving in an outwards radial direction and so provides a restoring force to any resistance encountered by the movement of the driven movable block 48 when this contacts the clamping surface 43 of the ring 31. The movable block 48 therefore acts as a dog and the driven block 49 acts as a drive dog.

The driven block 49 is actuated by means of the threaded bolt 50 that engages with a similarly threaded bore 55 in the driven block 49. The bolt 50 extends through a plain bore 56 in the collar above the axial bore 45 in a direction parallel with the collar axis 34 such that when the bolt is turned, the driven block is pulled or pushed in one or the other of the axial directions, while the axis of the bolt remains fixed. The bolt 50 has a hexagonal head 58 that is seated in recess 59 in a conically shaped section 60 of the collar 32, the recess being sized so that suitable tools may turn the bolt. During assembly, each bolt is individually actuated and tightened so that the collar is evenly clamped to the ring.

This is achieved by supporting the majority of the tower weight using an installation crane (not shown) and then actuating previously identified high and low side clamping blocks 48 to initially move the connection over on the top radius of the ring seat 37 until verticality is achieved. The clamping blocks 48 may then be clamped into position. The remaining clamping blocks are then actuated to provide a pre-loaded and structural connection to the pile. It is worth noting that the external clamping surface 43 is engineered to accept the various positions of the clamping blocks on this surface.

Although in this example actuation is mechanical through a bolt arrangement, it would also be possible to use a hydraulic running tool and then mechanically lock each clamping block using, by way of example, threaded bolts, studs and or nuts.

Each clamp 41 is designed mainly for single use, and for long lifetime in salty conditions. Each axial bore 45 within the collar 32 may be packed with grease to ensure smooth movement of the sliding blocks and to minimize the rate of corrosion. The number of parts in the moving mechanism is kept to a minimum to ensure reliability, both when the clamping connection is made, and when the connection is to be released when the tower is to be disassembled, which could be after a period as long as 50 years.

Although the clamping connector described above has no spring or hydraulic mechanism to control the movement of the blocks 48, 49 or to provide a retraction force to push the movable block 48 to a retracted orientation, such features could be provided if necessary.

As can be seen from FIGS. 5 to 7, the clamping surface 43 is oppositely inclined with respect to the curved surface 38 of the seat 37, which together form a projection or lip 65 that extends fully around the circumference of the ring 31. The movable block therefore has a chamfer 62, with a circumferentially curved profile, to match the circumferentially curved and inclined shape of the clamping surface 43. The clamping force is therefore directed normal to the inclined clamping surface with components both in a radial direction and an axial direction, while the weight of the main tower 102 also generates a force on the seat 37 with both radial and axial components. The effect with the movable blocks 48 each fully tightened is that the lip 65 of the ring 31 is securely gripped on opposite inclined sides, thereby securely fixing the main tower to the base support at the desired tilt angle between the ring and collar axes 33, 34.

The first connector 26 may have a groove 66 or other features for the attachment of other necessary features to the assembled turbine tower, for example a deck, an access platform, a boat landing, an access ladder or J tubes for power cables. Although not illustrated, the second connector may also have similar attachment features.

In use, each connector assembly 20 can support the weight of a typical wind turbine, currently up to 1,400 tonnes, when clamped to a tubular supporting member such as a pile 114 that is approximately 6 m in diameter. The connector assembly 20 can also accommodate a deviation from circularity in such a tubular supporting of up to about ±1.5% and with a tolerance on nominal diameter of about ±1.0%.

The disclosure described above provides the ability to adjust the angle between the main tower and support structure and hence the verticality of the tower without relying on a grouted interface. The predicted lifetime of the connector assembly is also much greater than that of a grouted interface. The disclosure therefore provides a convenient, safe and speedy connector assembly for making a structural connection that lends itself to offshore turbine towers both above and below the waterline, but is not necessarily limited to these applications.

One additional benefit of the disclosure is that the larger cross-section profile of the first connector portion, as compared with that of the supporting tubular structure, can provide a useful handling means for the pile via a running tool and a larger and more efficient drive face that would be less prone to piling damage.

It should be noted that although the disclosure is particularly applicable to cases in which the assembled tower is in a substantially vertical orientation, but is also applicable to other structures where the axial alignment of neighbouring tubular members needs to be adjustable or in which an assembled structure is at an angle to vertical, for example when used as an arch or brace as part of a larger structure.

It should also be noted that although the disclosure has been described in detail with the first connection portion (i.e. the connector portion that is affixed at the upper end of the lower base structure) as having the ring, and the second connector portion (i.e. the connector portion that is affixed at the lower end of the tower) as having the collar, the disclosure is also applicable to the case where the first connector portion has the collar and the second connector portion has the ring.

It is to be recognized that various alterations, modifications, and/or additions may be introduced into the constructions and arrangements of parts described above without departing from the spirit or scope of the present disclosure, as defined by the appended claims.

The invention claimed is:

1. A connector assembly for affixing a main tower to a lower base structure, the connector assembly comprising:
   two connector portions,
      a first connector portion of said connector portions being for affixing at an upper end of said lower base structure, and
      a second connector portion of said connector portions being for affixing at a lower end of said tower,
      one of said connector portions having a ring and the other of said connector portions having a collar,
         the ring defining a ring axis and the collar defining a collar axis and having an opening for receiving the ring, and
      said connector portions including one or more clamps for clamping engagement of the ring within the collar; wherein
   the ring includes a seat and the collar includes an abutment, the abutment being in contact with the seat for transferring the weight of said tower to said base structure when the ring is clamped within the collar by the one or more clamps;
   the ring has a main body and a flange, the main body having a circumference and the flange extending around said circumference and radially outwards from the main body of the ring, the flange having a first inclined surface, a projection adjacent to the first inclined surface, and a second inclined clamping surface adjacent to the projection and said first inclined surface providing said seat; and
   the contact between the seat and the abutment is along an interface that permits tilt adjustment of the ring axis and collar axis prior to said clamping engagement of the ring within the collar, the opening of the collar being arranged to receive the ring after said affixing of said connector portions to respective ones of the main tower and the lower base structure.

2. The connector assembly as claimed in claim 1, in which said interface includes at least one surface that is curved to permit ball and socket type movement between the first and second connector portions, wherein said curved surface is curved in a plane that includes either the collar axis or the ring axis.

3. The connector assembly as claimed in claim 1, in which said interface permits said tilt adjustment of the ring axis and collar axis in two orthogonal directions.

4. The connector assembly as claimed in claim 1, in which said interface includes at least one surface that lies on an annulus of a spherical surface.

5. The connector assembly as claimed in claim 4, in which said interface includes surfaces on both the seat and abutment that are curved to permit ball and socket type movement of the first and second connector portions.

6. The connector assembly as claimed in claim 1, in which the one or more clamps includes a plurality of movable members mounted in the collar and an actuation member for driving the movement of said plurality of movable members to engage with the ring.

7. The connector assembly as claimed in claim 6, in which each movable member of the plurality of movable members comprises a respective dog movable in a radial direction, the movement of each dog being driven by a corresponding drive dog movable in an axial direction, each dog and drive dog having oppositely inclined surfaces in contact with each other such that the axial movement of a drive dog causes a radial movement in the corresponding dog.

8. The connector assembly as claimed in claim 7, in which:
   the collar has an inner wall and an outer wall, the inner wall being adapted to surround the ring with a gap between collar and the ring;
   the inner wall has a plurality of apertures, each aperture leading to a respective passage through the inner wall; and
   each of said dogs is slidably seated in one of said passages for movement in a radial direction with respect to the ring axis.

9. The connector assembly as claimed in claim 8, in which the flange is bounded by an adjacent channel in the main body of the ring, said channel providing said passages so that the flange is held between the abutment and said movable members when the ring is clamped within the collar.

10. The connector assembly as claimed in claim 6, in which the ring has a recess in which said movable members are located to clamp the ring within the collar.

11. The connector assembly as claimed in claim 1, in which the flange has a pair of opposite side surfaces, one of said side surfaces providing said seat and the other of said side surfaces providing a clamping surface for said clamping engagement of the ring within the connector.

12. The connector assembly as claimed in claim 11, in which said side surfaces extend away from the main body of the ring such that said side surfaces are inwardly inclined with respect to each other.

13. The connector assembly as claimed in claim 1, in which the flange is a lip that extends around the circumference of the ring.

14. A turbine tower, comprising:
a main tower for supporting a turbine generator;
a lower base structure for supporting said main tower; and
a connector assembly for affixing the main tower to the lower base structure, the connector assembly comprising two connector portions,
a first one of said connector portions being for affixing at an upper end of said lower base structure, and
a second one of said connector portions being for affixing at a lower end of said tower,
one of said connector portions having a ring and the other of said connector portions having a collar,
the ring defining a ring axis and the collar defining a collar axis and having an opening for receiving the ring, and
said connector portions including one or more clamps for clamping engagement of the ring within the collar, and wherein
the ring includes a seat and the collar includes an abutment, the abutment being in contact with the seat for transferring the weight of said tower to said base structure when the ring is clamped within the collar by the one or more clamps,
the ring has a main body and a flange, the main body having a circumference and the flange extending around said circumference and radially outwards from the main body of the ring, the flange having a first inclined surface, a projection adjacent to the first inclined surface, and a second inclined clamping surface adjacent to the projection and said first inclined surface providing said seat,
the contact between the seat and the abutment is along an interface that permits tilt adjustment of the ring axis and collar axis prior to said clamping engagement of the ring within the collar, and
one of the connector portions is affixed to a lower end of the main tower and the other of the connector portions is affixed to an upper end of the lower base structure.

15. The turbine tower as claimed in claim 14, in which the lower base structure is configured to stand in a body of water.

16. The turbine tower as claimed in claim 14, in which the first one of said connector portions has the seat and the second one of said connector portions has the abutment.

17. The turbine tower as claimed in claim 14, in which the upper end of the lower base structure is substantially tubular and the first connector portion is substantially cylindrical, where the first connector portion is affixed to the upper end of the base structure.

18. The turbine tower as claimed in claim 14, in which the lower end of the main tower is substantially tubular and the second connector portion is substantially cylindrical, where the second connector portion is affixed to the lower end of the main tower.

19. A method of assembling a turbine tower, comprising:
affixing a lower base structure of the turbine tower to a supporting surface of the earth;
joining a first connector portion of two connector portions of the turbine tower at an upper end of said lower base structure, wherein
a connector assembly comprises the two connector portions, wherein
one of the two connector portions comprises a ring, wherein
the ring comprises a main body and a flange the main body having a circumference, wherein
the ring defines a ring axis,
a surface of the flange defines a mating surface of the ring, and
the flange extends around the circumference radially outwards from the main body of the ring, the flange having a first inclined surface, a projection adjacent to the first inclined surface, and a second clamping surface adjacent to the projection and said first inclined surface providing said mating surface of the ring, and
the other of the two connector portions comprises a collar, wherein
the collar defines a collar axis, and
the collar comprises a mating surface configured to mate with the mating surface of the ring, wherein
the mating surface of the ring and the mating surface of the collar are shaped to allow tilt adjustment of the ring axis and the collar axis, and wherein
the two connector portions are configured to clamp together using one or more clamps;
joining a second connector portion of said two connector portions at a lower end of a main tower of the turbine tower, wherein
the main tower is configured to support a turbine generator;
after joining the first connector portion and joining the second connector portion, bringing free ends of the two connector portions together, wherein bringing the free ends together comprises causing a mating surface of the ring of one of the two connector portions to come into contact with a mating surface of the collar of the other of the two connector portions;
adjusting a tilt of the ring axis and the collar axis to achieve a desired orientation of the main tower with respect to vertical; and
using the one or more clamps to clamp the ring within the collar in order to fix the orientation of the main tower with respect to vertical.

20. The method of assembling the turbine tower as claimed in claim 19, wherein:
a rim of the first connector portion is relatively stronger than the upper end of the base structure; and
the first connector portion is joined to the upper end of the base structure prior to said affixing the lower base structure to the supporting surface of the earth, such that the rim is at an upper end of said joined base structure and first connector portion; and wherein
affixing the lower base structure to the supporting surface of the earth comprises driving the joined base structure and first connector portion into the supporting surface of the earth using force applied to the rim at the upper end of the joined base structure.

* * * * *